Dec. 29, 1970  R. H. FORESTER ET AL  3,551,244

METHOD OF PRODUCING AN ULTRATHIN POLYMER FILM LAMINATE

Filed April 3, 1968  2 Sheets-Sheet 1

INVENTORS
RALPH H. FORESTER
PETER S. FRANCIS
BY Merchant & Gould
ATTORNEYS

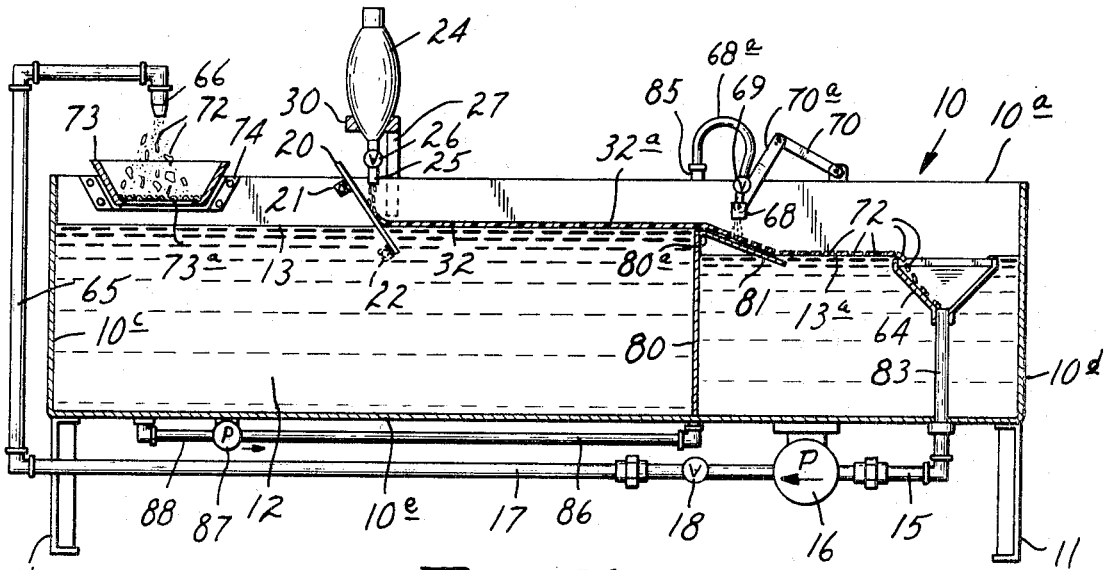
FIG. 5
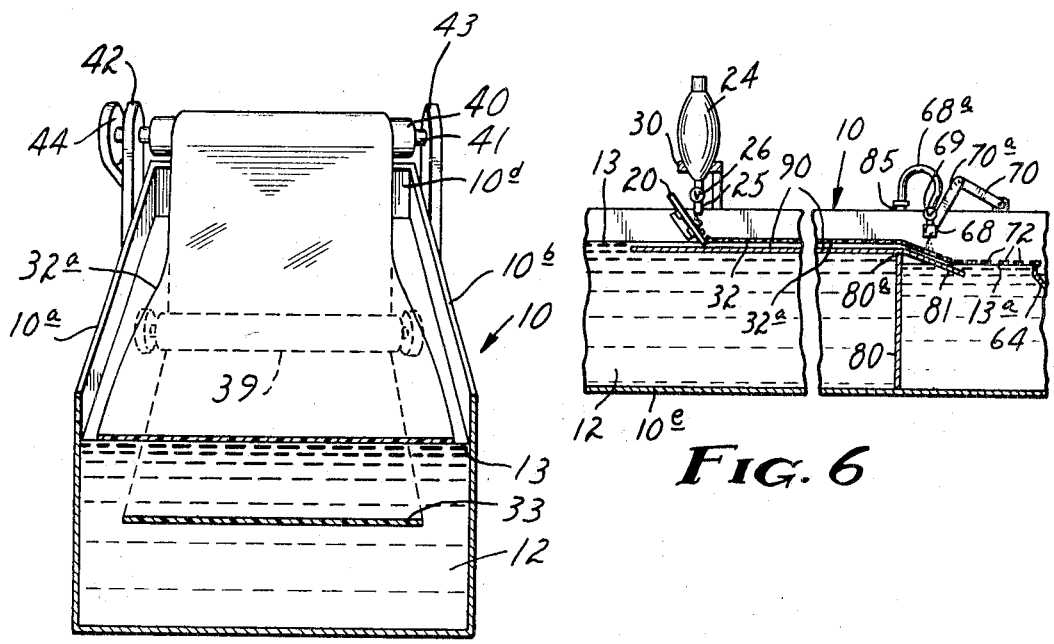
FIG. 3
FIG. 6
INVENTORS
RALPH H. FORESTER
PETER S. FRANCIS
BY Merchant & Gould
ATTORNEYS

United States Patent Office 3,551,244
Patented Dec. 29, 1970

3,551,244
METHOD OF PRODUCING AN ULTRATHIN POLYMER FILM LAMINATE
Ralph H. Forester, Minneapolis, Minn., and Peter S. Francis, Wallingford, Pa., assignors to North Star Research and Development Institute, Minneapolis, Minn., a nonprofit corporation of Minnesota
Filed Apr. 3, 1968, Ser. No. 718,384
Int. Cl. B29c 23/00
U.S. Cl. 156—246          1 Claim

ABSTRACT OF THE DISCLOSURE

A polymer solution flows down an inclined plane onto a water surface to form, on the water surface, generally in the direction of flow, a thin sheath of solution having a generally uniform thickness. The polymer solution spontaneously spreads and as the solvent evaporates, a solid, ultrathin film is formed. As the film forms, it is continuously removed from the surface by drawing a strong, elongated support membrane upwardly from below the water surface through the film-water interface at a rate such that a film of desired thickness is obtained. The film adheres to the support membrane as it is drawn from the water and is laminated to the support membrane as they dry. Alternatively, the film can be removed from the water surface in flake form after subjecting it to a high pressure, downwardly directed water spray to break it into flakes. In the flake forming process, movement of the film from the formation area to the removal area can be aided by continuously moving the water surface in that direction.

BACKGROUND OF THE INVENTION

Field of the invention

This invention relates generally to ultrathin polymer films formed by casting a polymer solution on a liquid surface, and more particularly relates to the continuous manufacture of such films.

Description of the prior art

Techniques have been recently developed to both manufacture and use ultrathin polymer films having a thickness on the order of from 0.05 to 5.0 microns. One method of forming ultrathin polymer films consists basically of slowly drawing a clean glass plate from a dilute solution of a polymer in a solvent. This technique is reported by P. H. Carnell (Journal of Applied Polymer Science, 9 p. 1863, 1965). In this prior art method, great care must be taken with the glass withdrawal rate, which is on the order of inches per minute, with air flow over the plate, and with cleanliness. Finally, the film must be stripped from the substrate without damaging it, in itself a very difficult task.

Ultrathin polymer films can also be made by casting a concentrated solution of the polymer on a liquid surface. This method of making ultrathin films is described in the John E. Cadotte et al. patent application Ser. No. 856,516, filed July 31, 1969, for "Reverse Osmosis." The casting solution is prepared by dissolving a selected polymer in a solvent until the solution has a consistency about equal to varnish or light syrup. The solution is then cast on a liquid surface where it spreads spontaneously over the surface. As the solvent evaporates, a polymer residue remains in the form of an ultrathin film. After the film is formed on the surface, it is removed by manually inserting a support member under the film and slowly raising it upwardly to allow liquid to escape from between the film and the support member. Prior to the present invention, this procedure was carried out by hand in a batch-type operation with small amounts of material. A few drops of the polymer solution were placed on the liquid, the film was permitted to form, the resulting small quantity of film was removed, and then the procedure was repeated. While this technique was suitable for research purposes where only small quantities of film were needed, the full potential for utilizing ultrathin polymer films could never be realized without the development of a continuous fabrication process. The present invention provides such a process.

Many uses have been developed for ultrathin films, and it is believed that many more will be developed now that commercial fabrication of film in large quantities is made feasible by the present invention. For example, the purification of sea water and brackish water with these films has been of particular interest. Some of these ultrathin films are semi-permeable, and, therefore, remove ions from water by reverse osmosis. Since the films are not strong enough for reverse osmosis applications by themselves, it is necessary that they be mounted on a porous backup or support membrane that will provide the requisite mechanical strength.

Reverse osmosis applications of ultrathin polymer films are described in the previously mentioned Cadotte et al. application. To form a laminated composite of an ultrathin film and a porous support membrane, the individual layers are formed separately and then physically laminated. A convenient prior art lamination procedure comprises immersing in the liquid beneath the ultrathin film, a porous support membrane or a substrate, bringing the support at an angle of about 45° up to the floating film such that one edge of the floating film is superimposed on the support, and then drawing the support membrane and floating film from the surface of the liquid at an acute angle. Once formed, the composite will find utility in all major reverse osmosis separations. To use the composite, one merely has to substitute the composite membrane for the "modified" membranes used in conventional equipment assemblies, such as shown in U.S. Pat. 3,133,132.

Another important use of ultrathin polymer films is in the preparation of ultrathin polymer flakes. In this application, the film is first formed and then broken down or chopped up into flakes having a large length/thickness ratio. The flakes have the thickness of the parent film, and the length of the flakes may vary between 10 and 1,000 microns with a preferred range of about 50 to 100 microns. The flakes, when suspended in a liquid carrier such as water, form a highly viscous suspension that can be sprayed or otherwise applied to a surface, to form a reconstituted, coherent film on the surface as the liquid carrier evaporates or drains away. If a chemical agent, such as a herbicide, is added to the polymer solution before the ultrathin film or flakes are formed, the agent will be contained within the flakes and the flakes will act as carriers for the agents. Then, by spraying a flake suspension over the soil surface to form the reconstituted film, the agent can be evenly distributed over the surface of the soil and securely held in place.

Further information on ultrathin films in flake form can be found in the co-pending Forester et al. application Ser. No. 696,116, filed Jan. 8, 1968.

Current technology for the preparation of ultrathin polymer films is inadequate to the task of preparing sufficient film to meet the requirements of any commercial application. Therefore, we have devised a process and apparatus for continuously manufacturing ultrathin polymer films.

SUMMARY OF THE INVENTION

The present invention provides means for continuously forming ultrathin polymer films suitable for use in reverse osmosis applications, in flake form, or in any other application for the films. Other uses for the films made by this process include artificial kidney membranes, balloons, and packaging materials. According to the present invention, the film-forming solution continuously flows onto a water surface at a feed point. The solution may flow down an inclined plane or by other means onto the water surface. The polymer solution spontaneously spreads on the water surface allowing the solvents to be removed rapidly by water extraction and evaporation. A solid, ultrathin film is thus formed.

The film that is formed on the surface must be continuously removed at the same rate as it is formed if the entire process is to be continuous. If ultrathin polymer flakes are needed, the film that is continuously forming can be carried by a moving liquid surface to a point where it is subjected to a downwardly directed water spray to break up the film after it forms. The film, after being subjected to the water spray, is filtered from the water and then subjected to further chopping to obtain the desired size.

If a composite film is desired, as for reverse osmosis applications, the film is removed from the surface by drawing a suitable support material upwardly through the liquid surface at the leading edge of the film-liquid interface. The floating film will adhere to the support material being drawn upwardly through the surface, and will laminate to the support material as they dry.

Basically, the ultrathin film that is continuously forming on the liquid surface is continuously removed from the liquid surface in a form that will be suitable for the end use application. The rate of film formation and the rate of withdrawal of the formed film can be coordinated so that a continuous process results.

It is, therefore, a primary object of our invention to provide means for the continuous manufacture of ultrathin polymer films. Other objects of the present invention will become apparent from a reading of the following specification and claim, taken in connection with the accompanying drawings.

BRIEF DESCRIPTION OF THE DRAWINGS

Referring to the drawings, wherein like characters indicate like parts throughout the figures:

FIG. 3 is a sectional view taken along line 3—3 of FIG. 2, shown in perspective, some parts thereof removed;

FIG. 5 is a sectional view similar to that shown in FIG. 2, showing a modified form of our invention; and FIG. 6 is a sectional view similar to FIG. 5 in a reduced scale, showing another modified form of our invention, some parts removed.

DESCRIPTION OF THE PREFERRED EMBODIMENTS

Figure 1:
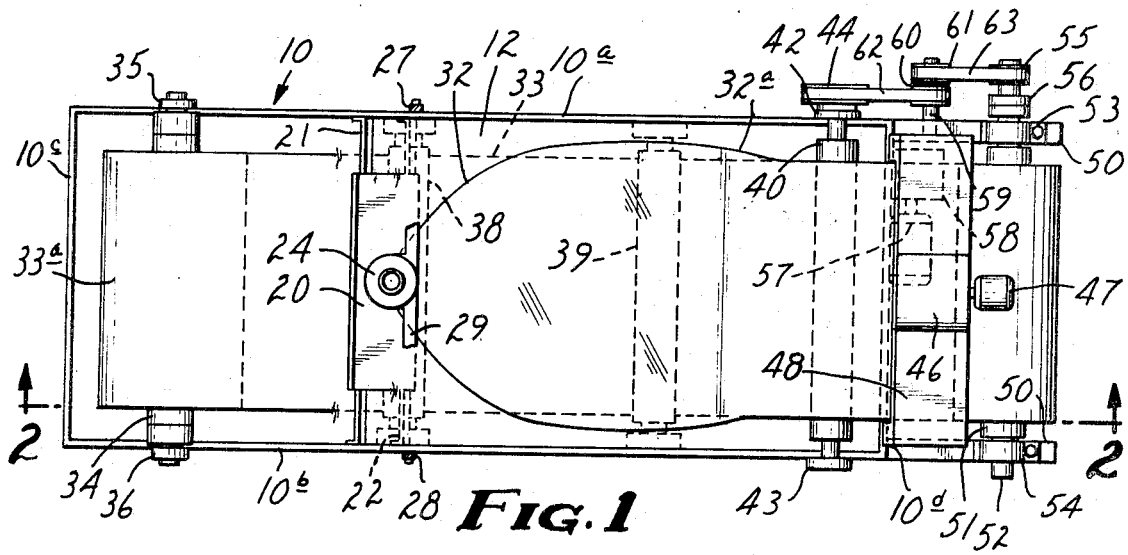
FIG. 1 is a top plan view of a system for continuously manufacturing ultrathin polymer films according to our invention, some parts broken away and shown in section.

In describing the preferred embodiments of our invention, like numerals will be used throughout the several views, wherever possible, to indicate like elements of the invention. A first embodiment of our invention is disclosed in FIGS. 1, 2, and 3. A box-like tank 10 is provided having a pair of parallel sides 10a and 10b, a pair of parallel ends 10c and 10d, and a bottom 10e. Tank 10 has an open top and is provided with a plurality of support legs 11. Tank 10 is filled with a liquid 12, such as water, to a desired level 13.

An inclined ramp member 20 is mounted in tank 10 between end 10c and end 10d. Ramp member 20 is mounted on a pair of laterally extending support bars 21 and 22 that are each bolted or otherwise attached at their opposite ends to sides 10a and 10b. Support bar 21 is positioned above the desired liquid level 13 and support bar 22 is positioned below the desired liquid level 13. Preferably, ramp member 20 is a generally rectangular metal or plastic sheet that is bolted, welded, or otherwise secured to support bars 21 and 22 so that its top edge lies well above the surface 13 of the liquid 12, and its bottom edge lies below surface 13. The inclination of ramp member 20 is such that it forms an acute angle with that portion of surface 13 lying between it and end 10c. The inclination of ramp member 20 can be changed by changing the relative position of support bars 21 and 22, or by any adjustable means not shown.

Preferably, the surface of ramp member 20 should be continuously renewed or cleaned to prevent the buildup of dried or water contaminated casting solution which can interfere with ultrathin film formation.

Mounted above ramp member 20 is a flask or container 24 having an open top through which a suitable polymer solution can be inserted into the flask. Flask 24 is provided with an outlet tube 25 at its bottom end through which the liquid contained in the flask can escape at a rate determined by an adjustable valve 26 mounted in tube 25. To provide support for flask 24, a pair of vertical support arms 27 and 28 are attached to opposite sides of tank 10. A horizontal support arm 29 extends across tank 10 and is supported at its opposite ends by support arms 27 and 28. A suitable clamp or annular support member 30 is secured near the center of horizontal support arm 29 so as to hold flask 24 directly over ramp member 20. Again, vertical support arms 27 and 28 are attached to the sides of tank 10 at the proper position to achieve the correct positioning of flask 24. It is evident that many other schemes for mounting and adjusting the position of flask 24 could be utilized without departing from the invention. If desired, the ramp member and flask could be replaced with a hopper arrangement designed to discharge a sheath of solution onto the surface. Other similar feed arrangements could be used without departing from the invention.

Figure 2:
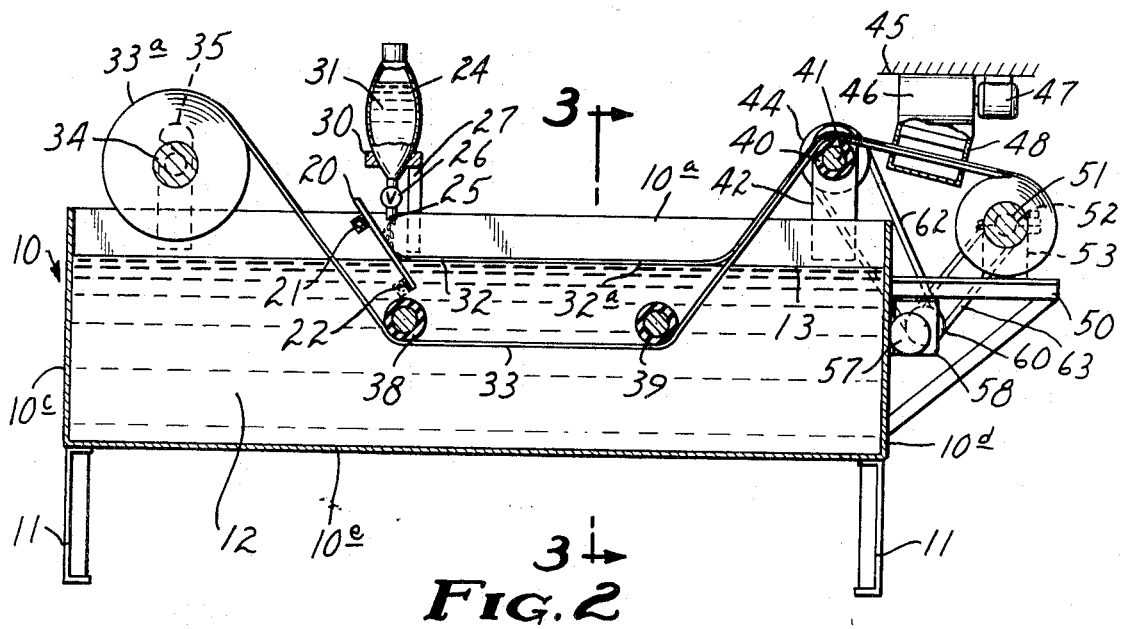
FIG. 2 is a sectional view taken along line 2—2 of FIG. 1.
Figure 4:
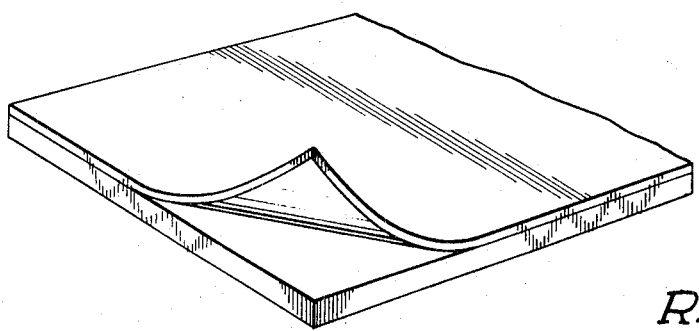
FIG. 4 is a perspective view of a short length of ultrathin polymer film laminated to a support membrane, greatly enlarged in thickness.

As shown in FIGS. 1 and 2, flask 24 is filled with a selected polymer solution 31, and valve 26 is adjusted to permit a continuous flow of the solution downwardly through tube 25 onto the upper surface of ramp member 20. When solution 31 strikes ramp member 20, it spreads outwardly as shown in FIG. 1, and flows downwardly onto surface 13 as a thin sheath of solution having a generally uniform thickness. This thin sheath of polymer solution on surface 13 is indicated by the numeral 32. The layer or sheath 32 of solution 31 spontaneously spreads on surface 13 toward end 10d. As the solvent is removed by water extraction and evaporation, a solid, ultrathin film is formed. Since the thin film forms in a gradual manner, no attempt has been made in the drawings to differentiate between the solution initially deposited on the surface and the film that forms from it. Further, the thickness of sheath 32 and the resulting film has been greatly enlarged on the drawing for illustrative purposes. For the purpose of more clearly describing the disclosure, the ultrathin film that forms from the sheath 32 is designated by the numeral 32a.

If polymer solution 31 is continuously deposited onto a first area of the liquid surface adjacent ramp member 20, it can be considered that ultrathin film 32a forms as the solution moves to a second area on surface 13 closer to end 10d. To remove film 32a as it forms, an elongated support material 33 is provided. A supply of support material 33 is provided in the form of a roll 33a from which the material can be unrolled as needed. Support material 33 is much thicker than film 32a, and is mechanically much stronger.

Means are also provided to continuously draw support material 33 through tank 10 in order to remove film 32a from the surface 13. Roll 33a is mounted on a supply roller 34 above tank 10 adjacent end 10c. Rotatable supply roller 34 extends laterally across tank 10 and is supported at its opposite ends by a pair of vertical support arms 35 and 36 attached to the sides of tank 10. The axis of rotation of supply roller 34 lies in parallel with surface 13 and perpendicular to side walls 10a and 10b.

Mounted in tank 10 beneath the first and second areas of surface 13 are a pair of rubber coated guide rollers 38 and 39. Preferably, rollers 38 and 39 are of the same size and are mounted with their axes in parallel with the axis of roller 34. In the preferred embodiment, the axes of rollers 38 and 39 lie in the same horizontal plane. Other guide roller arrangements could be utilized without departing from the invention.

Mounted above tank 10 adjacent end 10d is a first drive roller 40. Drive roller 40 is mounted on a drive shaft 41, the opposite ends of which are rotatably mounted in a pair of vertically extending support arms 42 and 43. Support arms 42 and 43 are attached to the opposite sides of tank 10. Drive shaft 41 is thus positioned in parallel with the axis of supply roller 34. One end of drive shaft 41 extends through support arm 42 and is provided with a drive pulley 44.

Mounted on end 10d is a shelf 50. A take-up roller 51, supported by a shaft 52, is mounted above shelf 50 by means of a pair of vertically extending support arms 53 and 54 in which shaft 52 is rotatably mounted. Shaft 52 lies in parallel with shaft 42 and the axis of roller 34. One end of shaft 52 extends through support arm 53 and is provided with a drive pulley 55. As shown in the drawings, we provide a slip clutch 56 between take-up roller 51 and drive pulley 55.

Mounted below shelf 50 on end 10d is a drive motor 57. Motor 57 drives an adjustable transmission device 58 having an output shaft 59 extending outwardly and parallel with the previously mentioned shafts. Mounted on the end of shaft 59 are a pair of drive pulleys 60 and 61. Pulleys 44 and 60 are connected by a drive belt 62, and pulleys 61 and 55 are connected by a drive belt 63. When motor 57 is energized, drive roller 40 and take-up roller 51 are rotated in the same direction at the speed determined by transmission device 58. In some cases, take-up roller 51 may provide the entire drive function, with roller 40 acting as a guide roller only.

The continuous manufacture of ultrathin film is carried out with the apparatus of FIGS. 1-3 as follows. A selected polymer is dissolved in a suitable solvent, is filtered, and the resulting solution is placed in flask 24, with valve 26 closed. Tank 10 is filled with a suitable liquid 12, such as water, to a desired surface level 13. Care should be taken that liquid 12 is clean and that no airborne particulate matter can fall onto the pool of casting solution or on the membrane as the membrane is being formed. The surface of the liquid 12 tends to be self-cleaning, as the solution spreading on the liquid surface pushes the surface layer away before it, leaving a clean surface for film formation. A roll 33a of support material 33 is provided, mounted on roller 34. Support material 33 is then threaded beneath guide rollers 38 and 39, over drive roller 40 and is attached to take-up roller 51. Motor 57 is then energized and transmission device 58 adjusted to achieve a desired speed of rotation of rollers 40 and 51. In the preferred embodiment, support material 33 is drawn upwardly through the liquid surface from guide roller 39 to drive roller 40 at an angle of approximately 45° with the surface. Although an angle of approximately 45° is preferred, the support material will pick up the film from the surface over a wide range of angles with respect to the surface.

Valve 26 of flask 24 is then opened to permit a selected amount of polymer solution to flow downwardly onto the surface of ramp member 20. Ramp member 20 is then positioned at an angle such that it spreads the solution to some extent before the solution reaches the liquid surface 13. The solution then spreads out onto the water surface as previously described, and forms an ultrathin film 32a as it moves away from ramp member 20. When the leading edge of ultrathin film 32a reaches the upwardly moving support material 33, it is picked up by the support material and carried on the upper surface thereof. Ultrathin film 32a is thus laminated to the upper surface of support material 33. Most of the liquid 12 adhering to either support material 33 or film 32a tends to drain off as the laminated support material and film move upwardly toward roller 40. As the film and support material fully dry, they become attached tightly together so that the dried two-layer film can be handled or rolled up without damage.

In order to insure that support 33 and film 32a are fully dry before reaching take-up roller 51, a separate drying device is mounted between roller 41 and roller 51. This drying device is mounted on a suitable support 45 and is designed to pass heated air over the laminated support material and film to remove excess moisture therefrom. The drying device includes a fan unit 46 driven by a motor 47. Mounted within the fan unit 46 is an electric heater (not shown). Heated air from fan unit 46 is distributed over both the top and bottom surfaces of the support material film laminate by a box-like structure 48 having slots in opposite side walls through which the laminate passes. The moisture laden air also escapes through these slots in box-like structure 48. Although a particular form of drying device is shown in the drawings, other means of drying the laminate could be used without departing from the invention.

Another apparatus for the continuous manufacture of ultrathin polymer films is shown in FIG. 5. To the extent that the structure is the same as shown in FIGS. 1-3, the same numbering system will be utilized. In this system, a baffle member 80 is mounted in tank 10 between ramp member 20 and end 10d. Baffle member 80 has a top edge 80a that acts to define the liquid surface level 13. Baffle member 80 is attached to both sides of the tank and to the tank bottom to divide the tank into a first film-forming section, and a second film removal section.

An inclined apron member 81 is mounted in the film removal section of tank 10 and extends the full distance between the side walls of tank 10. The upper edge of apron member 81 is connected to the top edge 80a of baffle member 80. An oppositely disposed lower edge of apron member 81 extends beneath the surface level 13a of the liquid in the film removal section. Thus, apron member 81 is basically a rectangular sheet of metal or plastic that slants downwardly from its connection with the upper edge 80a of the baffle member 80.

A pump 16 is provided having an intake conduit 15 and a discharge conduit 17. Extending upwardly through the bottom of and into tank 10 from intake conduit 15 is a conduit member 83 having a generally cone-shaped collector unit 64 attached to the upper end thereof. Collector unit 64 has an open top with the edge thereof lying in a horizontal plane that defines the surface level 13a in the film removal section of tank 10.

Discharge conduit 17 has an upward extension 65 leading to a discharge spout 66 positioned over tank 10 adjacent end 10c. Any liquid flowing into collector unit 64 from the second section of the tank is thus returned to the first section of the tank via discharge spout 66. With pump 16 in operation, a continuous flow of liquid 12 through tank 10 over apron member 81 is thus achieved. The rate and amount of liquid flowing over apron member 81 can be regulated by adjusting a valve means 18 in discharge conduit 17.

As in the previous embodiment, a polymer solution 31 from flask 24 is discharged onto ramp member 20 to spread outwardly as a thin sheath 32 on surface 13. As the sheath 32 moves toward baffle member 80, the solvent evaporates to form an ultrathin polymer film 32a that is carried over apron member 81 by the flowing liquid 12.

Mounted directly over apron member 81 is a high pressure water spray nozzle 68 attached to the end of a flexible hose 68a having adjustable valve means 69 therein. Water spray nozzle 68 is held in position over apron member 81 by an arm-like support structure including a first arm portion 70 pivotally attached to tank 10, and a second arm portion 70a pivotally attached thereto. Nozzle 68 is attached to the end of arm portion 70a. The arm-like structure can be moved longitudinally or upwardly and downwardly to position nozzle 68 at a selected position between the upper and lower edges of apron member 81. If necessary, a plurality of water spray nozzles 68 can be positioned across the width of tank 10 in a similar manner. When valve 69 is opened, a downwardly directed high pressure liquid spray impinges upon the ultrathin film passing over apron member 81. This spray tends to break down the film into small pieces or flakes 72 that are carried by the moving liquid into collector unit 64. Flakes 72 are then drawn into pump 16 with the liquid and are discharged from spout 66 with the liquid. During their passage through the pumping device 16, flakes 72 are further broken down into smaller sizes.

Flexible hose 68a is connected to a vertically extending conduit 85 that in turn is connected at its bottom end to a horizontally extending conduit 86. Conduit 86 is connected to a pump 87, which draws liquid from the bottom of the film-forming section of the tank through an intake conduit 88. Since the liquid being forced through nozzle 68 flows into the film removal section of the tank, is removed therefrom by pump 16 and returned to the film forming section of the tank for recirculation by pump 87, the level of liquid in the two sections remains constant. If a fresh supply of water from an outside source were to be used for the spray, some means of removing equivalent amounts of water from the film forming section of the tanks would have to be provided to maintain the proper level.

Mounted between the sides of tank 10, along the upper edges thereof, beneath spout 66, is a screening unit 73. Screening unit 73 is held in position by a pair of bracket assemblies 74 attached to the sides of tank 10. Unit 73 has a screened or cloth bag filter bottom portion 73a that permits the flow of liquid therethrough, but collects flakes 72. Screening unit 73 can be quickly and easily removed from brackets 74 to remove flakes 72 therefrom. As previously mentioned, flakes 72 can then be subjected to further processing if necessary for the end use application of the flakes.

A modification to the structure of FIG. 5 is shown in FIG. 6. The only difference is that an additional baffle 90 has been added. Otherwise, the structure of FIG. 6 is basically the same as that shown in FIG. 5. One end of baffle 90 is secured to the upper edge of baffle member 80, the two opposite side edges of baffle 90 are attached to the tank side walls 10a and 10b. Baffle 90 is mounted in parallel with the liquid surface 13 a short distance, preferably less than one inch, below surface 13. Thus, a relatively shallow layer of liquid 12 flows over baffle 90 and eventually over apron member 81. The bottom edge of ramp member 20 extends just below surface 13 so that liquid 12 can freely pass between it and baffle 90.

The thickness of the film 32a that is forming on the liquid surface can be regulated in several ways. First of all, the flow of polymer solution onto the liquid surface is controlled so that the film has sufficient time in which to form. Further, the viscosity and solids content of the feed solutions can be varied to regulate film thickness. In the apparatus of FIGS. 1, 2 and 3, the speed of the support material can also be varied.

In the apparatus of FIGS. 5 and 6, the flow of water over apron member 81 can be used to partially control the speed at which the thin film is formed. It has been found that rate of film withdrawal is mostly controlled by the "pull" on the film of the water flow over the ramp member 81. Therefore, the withdrawal rate can be controlled by raising or lowering the water level upstream from apron member 81. This upstream level is controlled by total water content in the system, the rate of water circulation, and the height of baffle 80, as long as the level in the second section of the tank 10 is low enough to permit water to flow down ramp 81. The water level in the second section of tank 10d is of course determined by the height of collector unit 64. Collector unit 64 can thus be raised or lowered with respect to conduit member 83 to change the liquid level in the second section of tank 10.

The length and height of apron member 81 in FIGS. 5 and 6 also is an important factor in determining rate of film formation and film thickness. As the water flows down apron member 81, it is accelerated by gravity. The further that the film moves down the apron member 81 before it is broken up by the spray, the more rapidly the film is formed and removed from the film formation area. Since the water accelerates as it moves down apron member 81, the film accelerates with it in proportion to amount of surface area of unbroken film in contact with the flowing water. To control the amount of film surface area in contact with the flowing water and thus control the speed of film formation and the film thickness, the spray nozzle 68 is adjusted so that the film is broken up a desired distance from the top of apron member 81. Once the film has been broken up by the spray, it cannot affect the speed of film removal. Thus, the closer nozzle 68 is positioned to the top of apron member 81, the slower will be the film withdrawal rate and the thicker the film will be. Conversely, to increase the film withdrawal rate and reduce film thickness, nozzle 68 is positioned further down apron member 81.

Another approach to controlling film formation is shown in FIG. 6. In this approach the depth of the water in the film formation area is made rather shallow through the use of baffle 90. By making this depth shallow and by adjusting pump flow, the rate of water movement can be more closely controlled. The speed at which the shallow layer of water moves can be more easily regulated and less turbulence results on the water surface. If desired, the baffle 90 can also be sloped in the direction of water flow to increase water velocity.

The ultrathin films that result from the present invention may range in thickness from 0.05 to 5.0 microns. For reverse osmosis applications, the ultrathin semi-permeable films of the present invention are less than 1 micron in thickness, with a range in thickness of from about 0.05 to 0.50 micron being desirable and the preferred range being from about .10 to .25 micron.

For reverse osmosis applications, the thin films of the present invention must be placed in combination with a porous support membrane. The two are laminated together by placing them in surface to surface contact. The porous support membrane protects the ultrathin film and provides a solvent passage means whereby solvent may be transferred away from the low pressure side of the ultrathin film. The porous support membrane should have pores generally smaller than about 5,000 A. and pores in the range of from about 500–2,000 A. are preferred, the smaller pore sizes being required for operation at higher pressures. The porous support membrane should be generally in the range of from 1–20 mils in thickness with a preferred thickness of from 2–7 mils. Materials presently available that may serve as porous support membranes include filter materials such as type VF and VM Millipore filters, which are fabricated from cellulose esters.

If the films are to be used in flake form, the preferred thickness is from 0.07 to 0.5 micron. The length of the flakes may vary between 10 and 1,000 microns with a preferred range of about 50 to 500 microns. The flakes are initially produced by subjecting the continuously forming film to a downwardly directed spray as shown in FIG. 5. The flakes may further be broken down in size by passing them through the pump 16. If further sizing is necessary or desirable, or if unformity of flake size is desired, a mechanical chopping device of some type can be used in order to achieve the necessary control of flake size. For example, the flakes can be chopped in a high shear or high speed mixer such as a blender.

A number of solvents and plastics may be used to form casting solutions. A casting solution is one formed by dissolving a selected polymer in a suitable solvent, The casting solution is then spread on a liquid surface as heretofore described to form the ultrathin film. Useful solvents include esters such as ethyl benzoate and ethyl acetate, ethers such as dioxane and ethylene glycol methyl ether, ketones such as methyl isobutyl ketone and cyclohexanone, alcohols such as amyl and ethyl, hydrocarbons such as xylene and hexane, halogenated hydrocarbons such as chloroform and chlorobenzene, and mixtures of these with each other or with small amounts of dimethylformamide or dimethyl sulfoxide. These solvents are particularly suitable when water is used as the liquid upon which the solution is cast.

Plastics from which ultrathin membranes can be made include acrylonitrile-butadiene-styrene; acrylics such as polymethyl methacrylate and styrene-acrylonitrile; polysaccharide derivatives such as beta glucan acetate, cellulose acetate, and cellulose nitrate; halogenated polymers such as Penton, a chlorinated polyether; polyamides such as nylon 66; polycarbonates; polyphenylene oxide; polysulfone; polystyrene; vinyls such as polyvinyl chloride and polyvinyl acetate; polyesters, such as polyethylene terephthalate, and polyolefins such as polyethylene and polypropylene. In general, both thermoplastic and crosslinked thermosetting resins can be used.

The above plastics can be made into either continuous membrane sheet or flakes. In addition, elastomeric plastics, which are too flexible to be broken readily into flakes or too tacky to be useful as flakes, can be made in the form of continuous membrane sheets. Examples of such plastics are butylenes, such as polyisobutylene, urethans such as Estane 101 (a polyether polyurethan), and polyepichlorohydrin.

To prepare the casting solution, the polymer should be dissolved in the solvent to give a solution having a consistency about equal to varnish or light syrup. This viscosity will generally be obtained by solutions of 0.5–35% polymer concentration and usually will be found to be in the range of 3–25% polymer. The casting solution spreads spontaneously when poured on the liquid surface. Liquids upon which films have been cast include water, aqueous inorganic salt solutions, aqueous urea solutions, glycerine and mercury.

The temperature of the casting step has not been found to be limiting. Good results have been obtained when operating over a wide range of temperatures. After the solution has been cast, the solvent is allowed to evaporate, leaving a polymer residue in the form of an ultrathin film. The thickness of the film may easily be controlled by regulating such factors as casting solution concentration, water temperature, solvent mixture and viscosity, rate of water flow in the tank, and the rate at which the film is removed from the tank.

As an example, a 4 to 5% solution of cellulose acetate in cyclohexanone was used as the casting solution. This solution, contained in flask 24, was allowed to flow downwardly onto ramp member 20. Ramp member 20, made of polyethylene, delivered a sheath of polymer solution onto the water surface. An ultrathin film was formed from the spreading action of the polymer solution on the surface of the water, and the resulting evaporation of the solvent. The film 32a thus formed was lifted from the water by a moving support membrane 33 approximately 12-inches wide, as shown in FIGS. 1–3. The rate of membrane withdrawal was adjusted by means of transmission device 58 so that an estimated membrane thickness of 1,500–2,000 angstroms resulted.

Several runs were conducted. In all cases, it was possible to produce an ultrathin film of the desired thickness, as determined by color, and also to pick up this film on the support membrane 33. The ultrathin film adhered tightly to the support membrane, after drying, and the resulting laminate could be rolled up without damaging it.

Although we have described the preferred embodiments of our invention, it will be apparent that changes within the spirit and scope of the invention may be made by those skilled in the art. Therefore we intend to be bound only by the scope of the appended claim.

What is claimed is:
1. A method of continuously adhering an ultrathin film to a support material comprising the steps of:
（a) delivering a continuous flow of a polymer solution onto a first area of a liquid surface;
(b) inducing said solution to move from said first area to a second area on said surface, said solution forming an ultrathin film on said surface as it moves to said second area; and
(c) continuously moving an elongated support material from beneath the surface of said liquid upwardly through the liquid film interface at said second area with a surface of said support material in contact with the underside to remove said film in contact with said support material from said liquid surface and to adhere said film to said support material of said film.

References Cited

UNITED STATES PATENTS

| | | | |
|---|---|---|---|
| 2,996,418 | 8/1961 | Bleil | 156—246 |
| 2,998,841 | 9/1961 | Rowe | 156—246X |
| 3,266,966 | 8/1966 | Patchell | 156—246X |

CARL D. QUARFORTH, Primary Examiner

S. J. LECHERT, JR., Assistant Examiner

U.S. Cl. X.R.

18—15; 156—306; 264—212, 298